UNITED STATES PATENT OFFICE 2,594,184

DIHALO-ALKENYL ALKENOATES

Elbert C. Ladd, Passaic, N. J., assignor to United States Rubber Company, New York, N. Y., a corporation of New Jersey No Drawing. Application December 30, 1948, Serial No. 68,393

3 Claims. (Cl. 260—486)

The invention relates to a new class of esters consisting of the esters of ethylenically unsaturated mono- and poly-carboxylic acids with 3,3-dihalogeno-2-propen-1-ols of the formula $$X_2C=CH-CHR-OH$$

wherein each X is fluorine, chlorine, or bromine, and R is selected from the class of hydrogen and hydrocarbon.

My new polyolefinic esters can be readily prepared by the reaction of a 3,3-dihalogeno-2-propenyl halide $X_2C=CH-CHR-Y$ wherein each X and Y is one of the halogens fluorine, chlorine, and bromine, with an olefinic mono- or polycarboxylic acid or the alkali metal salt thereof. Indeed, in this reaction I have found that the 3,3-dihalogeno-2-propenyl halides display an unexpectedly high degree of reactivity in comparison with the next higher homologs, i. e., the 4,4-dichloro-3-butenyl halides.

The 3,3-dihalogeno-2-propenyl halide starting materials employed in my invention are in the main readily obtainable through the selective and partial dehydrohalogenation of compounds of the formula $X_3C-CH_2-CHR-Y$, which are the 1:1 adducts resulting from the free-radical-catalyzed (e. g., peroxide-catalyzed) reactions of olefinic compounds $CH_2=CHR$ with tetrahalogenomethanes $CX'_3Y'$, where each X' and Y' is chlorine or bromine, provided that Y' is chlorine only when every X' is chlorine, that is, when the tetrahalogenomethane $CX'_3Y'$ contains at least one bromine atom, it is invariably a bromine atom which splits off and adds as a separate unit to the olefinic compound. The 1:1 adducts are best made by reacting one molar proportion of the olefinic compound $CH_2=CHR$ with a considerable excess, preferably at least three molar proportions, of the tetrahalogenomethane at 20–200° C. in the presence of a peroxidic compound, e. g., benzoyl peroxide, present in an amount on the order of from 1 to 5% by weight of the amount of olefinic compound. The selective, partial dehydrohalogenation of the 1:1 adducts may be carried out by the process disclosed in the application of Ladd et al., Serial No. 24,446, filed April 30, 1948. The corresponding fluoro-compounds (i. e., where X and/or Y is fluorine) are best prepared by treating such adducts with a fluorinating agent, e. g., $SbF_3Cl_2$, as disclosed in my application, Serial No. 54,203, filed October 12, 1948, now abandoned. The preparation of these starting materials and their use in my invention can be illustrated as follows:

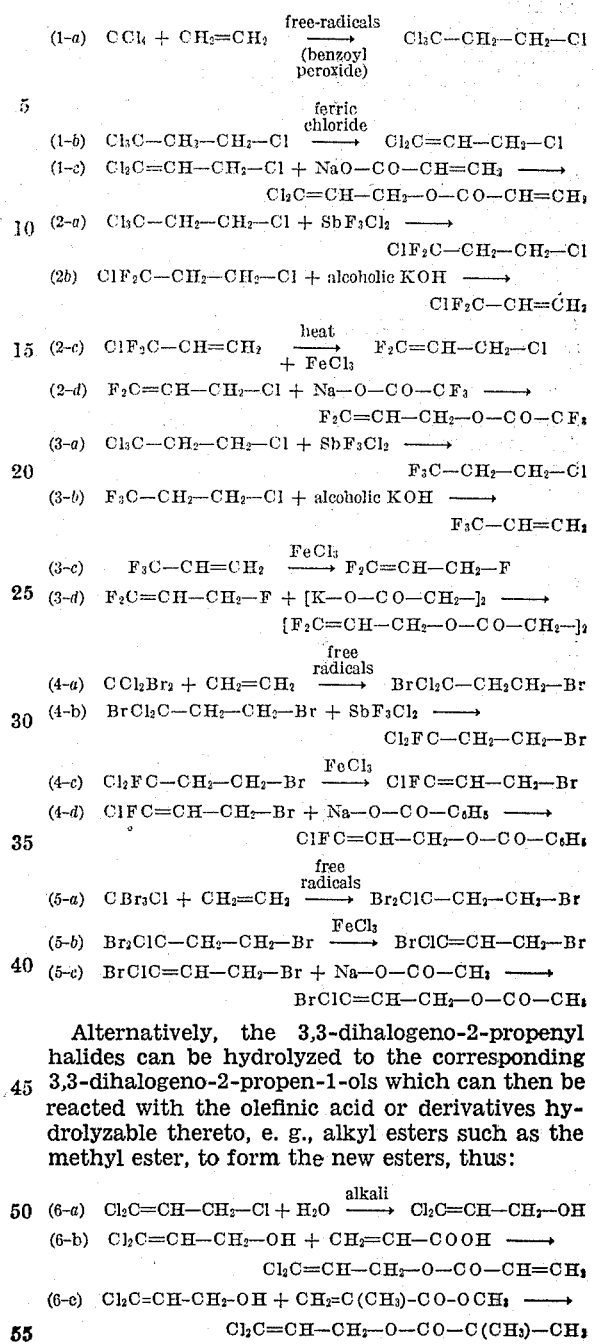

Alternatively, the 3,3-dihalogeno-2-propenyl halides can be hydrolyzed to the corresponding 3,3-dihalogeno-2-propen-1-ols which can then be reacted with the olefinic acid or derivatives hydrolyzable thereto, e. g., alkyl esters such as the methyl ester, to form the new esters, thus:

The new esters may also be made by ester interchange, thus:

(7)

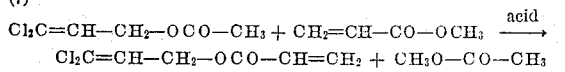

$$Cl_2C=CH-CH_2-OCO-CH_3 + CH_2=CH-CO-OCH_3 \xrightarrow{acid}$$
$$Cl_2C=CH-CH_2-OCO-CH=CH_2 + CH_3O-CO-CH_3$$

These reactions illustrate my invention for those 1,3,3-trihalogeno-2-propenyl compounds in which R is hydrogen. However, R may likewise be alkyl (e. g., methyl, ethyl, propyl, isopropyl, butyl, amyl, cyclopentyl, hexyl, cyclohexyl, heptyl, octyl, nonyl and decyl), alkenylalkyl (e. g., 3-butenyl and 4-cyclohexenyl), aryl (e. g., phenyl, tolyl, xylyl, naphthyl, xenyl, p-chlorophenyl, o, p-dichlorophenyl, p-fluorophenyl and p-methoxyphenyl), and aralkyl (e. g., benzyl. Exemplary of such compounds are 1,1,3-trichloro-1-butene, 1,1,3-trichloro-1-hexene 1,1,3-tribromo-1-nonene, 1,1,3-trichloro-1-nonene and 3-chloro-1,1-difluoro-3-phenyl-1-propene.

Of the olefinic acid reactants employed in my invention the 2-alkenoic and the 2-alkene-polyoic acids are preferred, including the monocarboxylic acids such as acrylic, methacrylic, ethacrylic, chloroacrylic, trichloracrylic, crotonic, cinnamic and tiglic acids, and the polycarboxylic acids such as maleic, chloromaleic, fumaric, itaconic, mesaconic, citraconic, aconitic, 3,4-dichlorodihydromuconic, carbic, and 3,4,5,6-tetrachloro-3,6-endo(dichloromethylene)-tetrahydrophthalic acids. As indicated above, these acids may be employed in the form of their salts, preferably the alkali metal salts; e. g., sodium acrylate, potassium crotonate, and sodium maleate.

Illustrative of the new esters of my invention are 3,3-dichloro-2-propenyl acrylate, bis (3,3-dichloro-2-propenyl) maleate, bis(3,3-dichloro-2-propenyl) fumarate, 3,3-difluoro-2-propenyl acrylate, 3,3-dichloro-2-propenyl methacrylate, 3,3-difluoro-2-propenyl chloroacrylate, and 3,3-dichloro-2-propenyl crotonate.

These new compounds are particularly useful in the preparation of addition-type polymers and copolymers, but they also find use in the preparation and/or synthesis of pharmaceuticals, plasticizers and lubricating oil additives.

In the preparation of my new compounds, substantially equivalent quantities of the 1,3,3-trihalogeno-2-propenyl compound and the olefinic acid or its alkali metal salt are heated together at temperatures in the range of 25° C. to 130° C. or higher, but preferably at from 50° C. to 100° C. until esterification has taken place, which may require from 2 to 24 hours. Diluents, e. g., alcohols, such as ethanol or butanol, may be employed to homogenize the reaction mixture if necessary. The products can be isolated by preferential extraction, and/or by fractional distillation, the latter process being preferably conducted in the presence of a polymerization inhibitor, e. g., p-tert.-butylcatechol.

The following example discloses my invention in more detail. All parts are by weight.

Example

A solution of 72.69 parts of 3,3-dichloro-2-propenyl chloride (i. e., 1,1,3-trichloropropene) and 50.0 parts of sodium acrylate in about 240 parts of 95% aqueous ethanol is refluxed with stirring for 12 hours. The reaction mixture is then diluted with two volumes of water and the resulting non-aqueous layer is separated, dried, and fractionally distilled to yield 13.4 parts of the new compound, 3,3-dichloro-2-propenyl acrylate, B. 37–44° C./2 mm.; $n_D^{20}$ 1.4842; percent chlorine, 39.17 (theory, 41.11). This compound polymerizes spontaneously, albeit slowly, at room temperature.

Having thus described my invention, what I claim and desire to protect by Letters Patent is:

1. A 3,3-dihalogeno-2-propenyl ester of a 2-alkenoic acid.
2. A 3,3-dichloro-2-propenyl ester of a 2-alkenoic acid.
3. 3,3-dichloro-2-propenyl acrylate.

ELBERT C. LADD.

REFERENCES CITED

The following references are of record in the file of this patent:

UNITED STATES PATENTS

| Number | Name | Date |
| --- | --- | --- |
| 2,296,823 | Pollack | Sept. 22, 1942 |
| 2,388,440 | Rehberg | Nov. 6, 1945 |